(12) United States Patent
Chen et al.

(10) Patent No.: US 9,479,778 B2
(45) Date of Patent: Oct. 25, 2016

(54) DEVICE AND METHOD FOR CODING VIDEO INFORMATION USING BASE LAYER MOTION VECTOR CANDIDATE

(71) Applicant: QUALCOMM Incorporated, San Diego, CA (US)

(72) Inventors: Jianle Chen, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 13/963,982

(22) Filed: Aug. 9, 2013

(65) Prior Publication Data

US 2014/0044180 A1 Feb. 13, 2014

Related U.S. Application Data

(60) Provisional application No. 61/752,286, filed on Jan. 14, 2013, provisional application No. 61/751,205, filed on Jan. 10, 2013, provisional application No. 61/707,806, filed on Sep. 28, 2012, provisional application No. 61/682,714, filed on Aug. 13, 2012.

(51) Int. Cl.
*H04N 11/02* (2006.01)
*H04N 19/583* (2014.01)
*H04N 19/52* (2014.01)
(Continued)

(52) U.S. Cl.
CPC ........ *H04N 19/00733* (2013.01); *H04N 19/30* (2014.11); *H04N 19/51* (2014.11); *H04N 19/52* (2014.11)

(58) Field of Classification Search
USPC ....................................... 375/240.01–240.29
See application file for complete search history.

(56) References Cited

U.S. PATENT DOCUMENTS

| 2013/0003847 A1 | 1/2013 | Hong et al. |
| 2013/0107962 A1 | 5/2013 | Sim et al. |

(Continued)

FOREIGN PATENT DOCUMENTS

| GB | 2497812 A | 6/2013 |
| WO | 2012167711 A1 | 12/2012 |

OTHER PUBLICATIONS

Boyce J. et al., "Information for HEVC scalability extension", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-G078, Nov. 8, 2011, XP030110062, pp. 1-7.

(Continued)

*Primary Examiner* — Leron Beck
(74) *Attorney, Agent, or Firm* — Knobbe Martens Olson & Bear LLP

(57) ABSTRACT

An apparatus for coding video information according to certain aspects includes a memory unit and a processor in communication with the memory unit. The memory unit stores enhancement layer and base layer video information and a completed merge candidate list. The processor is in communication with the memory and is configured to create the completed merge candidate list associated with the enhancement layer video information. The processor is further configured to add base layer motion vector information as a candidate into the completed candidate list after the completed merge candidate list has been created to create a final candidate list.

29 Claims, 5 Drawing Sheets

(51) Int. Cl.
*H04N 19/51* (2014.01)
*H04N 19/30* (2014.01)

(56) References Cited

U.S. PATENT DOCUMENTS

2013/0188717 A1 7/2013 Chen et al.
2013/0343459 A1* 12/2013 Bici ................. H04N 19/00684
375/240.16

OTHER PUBLICATIONS

International Search Report and Written Opinion—PCT/US2013/054576—ISA/EPO—Nov. 22, 2013.

Kim C., et al., "Non-CE9: swapping of Merge Candidate", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-G396, Nov. 8, 2011, XP030110380; pp. 1-3.
Laroche G., et al: "Robust solution for the AMVP parsing issue", 96. MPEG Meeting; Mar. 21, 2011-Mar. 25, 2011; Geneva; (Motion Picture Expert Group or ISO/TEC JTC1/SC29/WG11) No. JCTVC-E219, Mar. 18, 2011, XP030048307, pp. 10.
Seregin V., "TE5: Using base layer MV in Merge and AMVP modes (test 5.2.2)," JCTVC-L0205, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 3 Pages.

* cited by examiner

DEVICE AND METHOD FOR CODING VIDEO INFORMATION USING BASE LAYER MOTION VECTOR CANDIDATE

CROSS-REFERENCE TO RELATED APPLICATIONS

This application claims priority to U.S. Provisional No. 61/752,286, filed Jan. 14, 2013, U.S. Provisional 61/751,205, filed Jan. 10, 2013, U.S. Provisional 61/707,806, filed Sep. 28, 2012, and U.S. Provisional No. 61/682,714, filed Aug. 13, 2012, which are each incorporated by reference in their entirety.

FIELD

This disclosure relates to HEVC scalable video coding (SVC) extension.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implemented such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

Some block-based video coding and compression makes use of scalable techniques. Scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. In some cases, the base layer may be transmitted in a manner that is more reliable than the transmission of enhancement layers.

SUMMARY

The systems, methods and devices of this disclosure each have several innovative aspects, no single one of which is solely responsible for the desirable attributes disclosed herein.

An apparatus for coding video information according to certain aspects includes a memory unit and a processor in communication with the memory unit. The memory unit stores enhancement layer video information, base layer video information, and a completed merge candidate list. The processor is in communication with the memory and is configured to create the completed merge candidate list associated with the enhancement layer video information. The processor is further configured to add base layer motion vector information as a candidate into the completed merge candidate list after the completed merge candidate list has been created to create a final candidate list.

A method of decoding video information according to certain aspects of the disclosure, includes storing, in a computer memory, enhancement layer video information, base layer video information, and a completed merge candidate list. The method includes creating the merge candidate list associated with the enhancement layer video information. The method also includes adding base layer motion vector information as a candidate into the completed merge candidate list after the completed merge candidate list has been created to create a final candidate list. The method also includes decoding the enhancement layer video information using the final candidate list.

A method of encoding video information according to certain aspects of the disclosure, includes storing, in a computer memory, enhancement layer video information, base layer video information, and a completed merge candidate list. The method includes creating the completed merge candidate list associated with the enhancement layer video information. The method also includes adding base layer motion vector information as a candidate into the completed candidate list after the completed candidate list has been created to create a final candidate list. The method also includes encoding the enhancement layer video information using the final candidate list.

DETAILED DESCRIPTION

Figure 1:
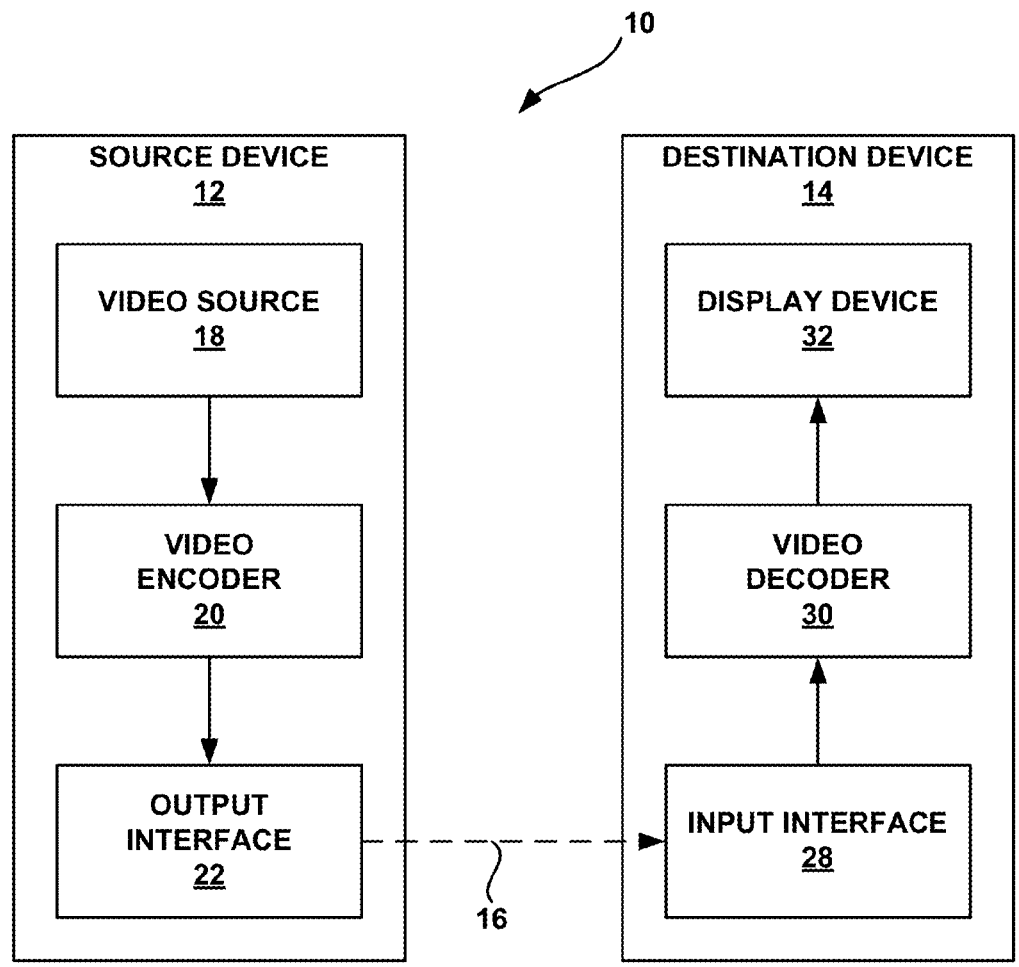
FIG. 1 is a block diagram illustrating an example video encoding and decoding system that may utilize techniques in accordance with aspects described in this disclosure.

A digital image, such as a video image, a TV image, a still image or an image generated by a video recorder or a computer, may consist of pixels arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

The techniques described in this disclosure generally relate to scalable high efficiency video coding (SVC, SHVC), multi-view coding and 3D video coding. For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

One coding technique utilized by HEVC, etc., is referred to as "merge mode." Merge mode is described in greater detail below. In merge mode, a "candidate list" is created from information associated with blocks surrounding a currently coded (encoded or decoded) block. In one technique, a motion vector from a base layer associated with the currently coded block is added to the candidate list during candidate list construction. Operations associated with candidate list construction, such as pruning, generation of combined bi-candidates, etc., will therefore be performed in the candidate list that includes the base layer motion vector candidates. However, to implement this process, standard candidate list constructions techniques must be changed. This can be undesirable, as such changes would generally require new logic for implementation. Therefore, it would be advantageous to maintain the current, traditional technique for generating a candidate list, while providing a process to take advantage of the benefits that follow from including one or more base layer motion vector candidates in the candidate list. For example, an initial, completed, merge candidate list may be constructed using standard techniques. The fields of the completed merge candidate list will have been populated by an initial group of candidate (e.g., enhancement layer motion vector candidates and sometimes a temporal motion vector predictor (TMVP) candidate), redundant entries will have been removed, or "pruned," and any resulting empty fields will have been filled by additional candidates (e.g., other enhancement layer motion vector candidates, artificial candidates, etc.). The completed merge candidate results from the completion of a candidate list generation process.

A final candidate list may be determined by modifying the initial, completed merge candidate list; for example, by inserting one or more new motion vector candidates into the initial candidate list and/or by replacing one or more candidates from an initial candidate list with one or more new motion vector candidates. The new one or more motion vector candidates may be determined from a base layer associated with a current block in an enhancement layer that is being coded.

For purposes of illustration only, the techniques described in the disclosure are described with examples including only two layers (e.g., lower level layer such as the base layer, and a higher level layer such as the enhanced layer, etc.). It should be understood that the examples described in this disclosure can be extended to examples with multiple base layers and enhancement layers as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://wg11.sc29.org/jct/doc_end_user/current_document.php?id=5885/JCTVC-I1003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTVC-I1003-v3.zip, as of Jun. 7, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, $9^{th}$ Meeting: Geneva, Switzerland, Apr. 27, 2012 to May 7, 2012. Each of these references is incorporated by reference in its entirety.

Scalable video coding (SVC) may be used to provide quality (also referred to as signal-to-noise (SNR)) scalability, spatial scalability and/or temporal scalability. An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer.

In inter-layer residual prediction, the residue of the base layer may be used to predict the current block in the enhancement layer. The residue may be defined as the difference between the temporal prediction for a video unit and the source video unit. In residual prediction, the residue of the base layer is also considered in predicting the current block. For example, the current block may be reconstructed using the residue from the enhancement layer, the temporal prediction from the enhancement layer, and the residue from the base layer. The current block may be reconstructed according to the following equation:

$$\hat{I}_e = r_e + P_e + r_b \quad (1)$$

where $\hat{I}_e$ denotes the reconstruction of the current block, $r_e$ denotes the residue from the enhancement layer, $P_e$ denotes the temporal prediction from the enhancement layer, and $r_b$ denotes the residue prediction from the base layer.

In order to use inter-layer residual prediction for a macroblock (MB) in the enhancement layer, the co-located macroblock in the base layer should be an inter MB, and the residue of the co-located base layer macroblock may be upsampled according to the spatial resolution ratio of the enhancement layer (e.g., because the layers in SVC may have different spatial resolutions). In inter-layer residual prediction, the difference between the residue of the enhancement layer and the residue of the upsampled base layer may be coded in the bitstream. The residue of the base layer may be normalized based on the ratio between quantization steps of base and enhancement layers.

SVC extension to H.264 provides single-loop decoding for motion compensation in order to maintain low complexity for the decoder. In general, motion compensation is performed by adding the temporal prediction and the residue for the current block as follows:

$$\hat{I}_e = r + P \quad (2)$$

where $\hat{I}$ denotes the current frame, r denotes the residue, and P denotes the temporal prediction. In single-loop decoding, each supported layer in SVC can be decoded with a single motion compensation loop. In order to achieve this, all blocks that are used to inter-layer intra predict higher blocks are coded using constrained intra-prediction. In constrained intra prediction, intra mode MBs are intra-coded without referring to any samples from neighboring inter-coded MBs. On the other hand, HEVC allows multi-loop decoding for SVC, in which an SVC layer may be decoded using multiple motion compensation loops. For example, the base layer is fully decoded first, and then the enhancement layer is decoded.

Residual prediction formulated in Equation (1) may be an efficient technique in H.264 SVC extension. However, its performance can be further improved in HEVC SVC extension, especially when multi-loop decoding is used in HEVC SVC extension.

In the case of multi-loop decoding, difference domain motion compensation may be used in place of residual prediction. In SVC, an enhancement layer may be coded using pixel domain coding or difference domain coding. In pixel domain coding, the input pixels for an enhancement layer pixels may be coded, as for a non-SVC HEVC layer. On the other hand, in difference domain coding, difference values for an enhancement layer may be coded. The difference values may be the difference between the input pixels for the enhancement layer and the corresponding scaled base layer reconstructed pixels. Such difference values may be used in motion compensation for difference domain motion compensation.

For inter coding using difference domain, the current predicted block is determined based on the difference values between the corresponding predicted block samples in the enhancement layer reference picture and the corresponding predicted block samples in the scaled base layer reference picture. The difference values may be referred to as the difference predicted block. The co-located base layer reconstructed samples are added to the difference predicted block in order to obtain enhancement layer reconstructed samples.

Motion Prediction and Merge Mode

Merge mode refers to one or more video coding modes in which motion information (such as motion vectors, reference frame indexes, prediction directions, or other information) of a neighboring video block are inherited for a current video block being coded. An index value may be used to identify a list of candidate neighbors from which the current video block inherits its motion information (e.g., a top, top right, top left, left, left bottom block, relative to the current block, or a co-located block from a temporally adjacent frame (such as a temporal motion vector predictor, or TMVP, as discussed in greater detail, below)). These candidates may be stored in a list, sometimes referred to as a merge candidate list. The merge candidate list can initially have a predetermined size. However, the list size may be reduced as a result of pruning (e.g., removing redundant or repeating list entries) or by truncation (e.g., if the video is coded to use a particular merge candidate list size). As the list size is reduced and candidates are deleted (or in situations that more candidates are inserted before TMVP), the TMVP may be removed from the list or not added to the list in some cases. However, various techniques, such as those described in greater detail below, may be utilized to ensure that the TMVP remains in the merge candidate list, even after the list is pruned or truncated. Embodiments of such techniques are described in greater detail below with respect to FIGS. 4 through 15.

Skip mode may comprise one type of merge mode (or a mode similar to merge mode). With skip mode, motion information is inherited, but no residual information is coded. Residual information may generally refer to pixel difference information indicating pixel differences between the block to be coded and the block from which the motion information is inherited. Direct mode may be another type of merge mode (or mode similar to merge mode). Direct mode may be similar to skip mode in that motion information is inherited, but with direct mode, a video block is coded to include residual information. The phrase "merge mode" is used herein to refer to any one of these modes, which may be called skip mode, direct mode or merge mode.

Another case where the motion vector of a neighboring video block is used in the coding of a current video block is so-called motion vector prediction or advanced motion vector prediction (AMVP). In these cases, predictive coding of motion vectors is applied to reduce the amount of data needed to communicate the motion vector. For example, rather than encoding and communicating the motion vector itself, video encoder 20 encodes and communicates a motion vector difference (MVD) relative to a known (or knowable) motion vector. In H.264/AVC, the known motion vector, which may be used with the MVD to define the current motion vector, can be defined by a so-called motion vector predictor (MVP), which is derived as the median of motion vectors associated with neighboring blocks. However, more advanced MVP techniques, such as adaptive motion vector prediction (AMVP) may allow video encoder 20 to select the neighbor from which to define the MVP. Hence, the use of merge mode may refer to the use of motion information from another block to code a current block, with or without residual information indicating pixel differences between the block to be coded and the other block. The use of AMVP may refer to the use of motion vector information from another block, with the use of an MVD value to indicate the differences between the MVP and the actual MV of the block to be coded. Techniques for selection of a candidate block to obtain motion vector information may be the same or similar for merge mode and AMVP.

As general background, in most video coding systems, motion estimation and motion compensation are used to reduce the temporal redundancy in a video sequence, in order to achieve data compression. In this case, a motion vector can be generated so as to identify a predictive block of video data, e.g., from another video frame or slice, which can be used to predict the values of the current video block being coded. The values of the predictive video block are subtracted from the values of the current video block to produce a block of residual data. The motion vector is communicated from a video encoder (such as video encoder 20 of FIGS. 1 and 2) to a video decoder (such as video decoder 30 of FIGS. 1 and 3), along with the residual data. The video decoder can locate the same predictive block (based on the motion vector) and reconstruct the encoded video block by combining the residual data with the data of the predictive block. Many other compression techniques can also be used, such as transforms and entropy coding, to further improve the video compression.

Video encoder usually performs the motion estimation process. Video encoder may transmit motion information (such as motion vectors, motion vector indexes, prediction directions, or other information) to video decoder so that video decoder is able to identify a predictive block used to encode a given video block.

AMVP has been proposed to build a motion vector candidate set by including several neighboring blocks in spatial and temporal directions as candidates for MVP. In this case, video encoder selects the most accurate predictor from the candidate set based on analysis of encoding rate and distortion (e.g., using so-called rate-distortion cost analysis). Video encoder may also signal a motion vector predictor index (mvp_idx) to video decoder to inform video decoder where to locate the MVP. Video encoder may also signal the MVD. Video decoder may combine the MVD with the MVP (defined by the motion vector predictor index) so as to reconstruct the motion vector. Video decoder (like video encoder) may define the set of candidate MVPs to which the index is applied based on various criteria.

As mentioned above, motion information can include at least motion vectors, reference frame indexes and inter prediction directions associated with a block. To code a current block, a list of merge candidates may be formed based on motion information from spatially and/or temporally neighboring blocks and artificial motion vector candidates. Instead of signaling the motion information of a current block directly, an index of the merge list is signaled from encoder to decoder. At the decoder side, the same merge list can be constructed. Based on the received index, the decoder can look up the motion information from the merge list and use it as the motion information for the current block.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., GOPs. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular, etc.) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision, etc.), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be co-located with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Encoder

Figure 2:
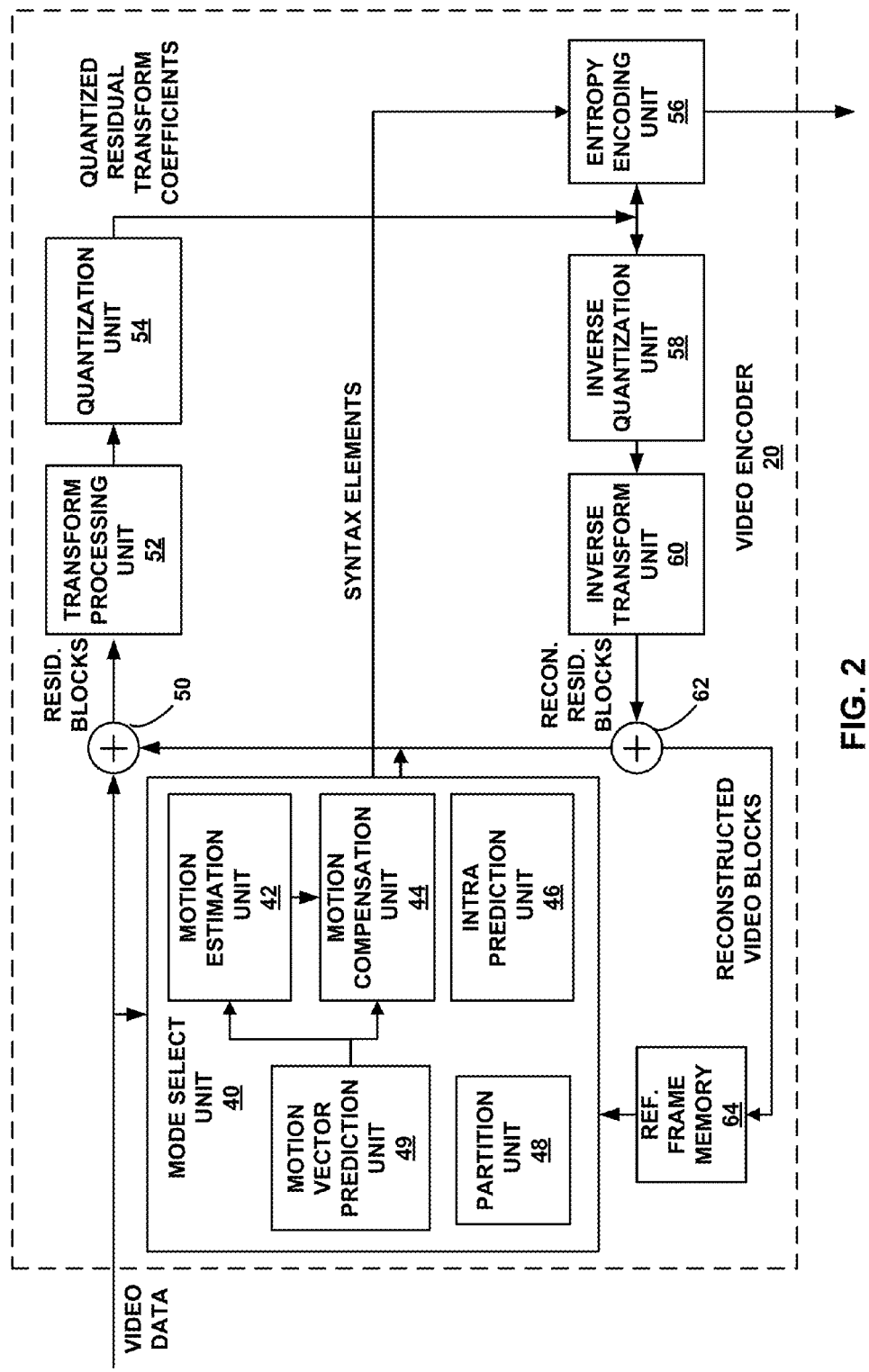
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, partition unit 48 and motion vector prediction unit 49. Motion vector prediction unit 49 is configured to perform the methods of coding described below with respect to FIGS. 4-6. In some embodiments, the functionality of the motion vector prediction unit 49 may be provided by the motion estimation unit 42, motion compensation unit 44, a unit of the mode select unit 40, or a unit in communication with the mode select unit 40.

For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List j) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In another embodiment, not shown, a filter module may receive the reconstructed video block from the summer 62. The filter module may perform a deblocking operation to reduce blocking artifacts in the video block associated with the CU. After performing the one or more deblocking operations, the filter module may store the reconstructed video block of the CU in decoded picture buffer. The motion estimation unit 42 and the motion compensation unit 44 may use a reference picture that contains the reconstructed video block to perform inter prediction on PUs of subsequent pictures. In addition, the intra prediction unit 46 may use reconstructed video blocks in the decoded picture buffer to perform intra prediction on other PUs in the same picture as the CU. Thus, after the filter module applies a deblocking filter to the samples associated with an edge, a predicted video block may be generated based at least in part on the samples associated with the edge. The video encoder 20 may output a bitstream that includes one or more syntax elements whose values are based at least in part on the predicted video block.

Video Decoder

Figure 3:
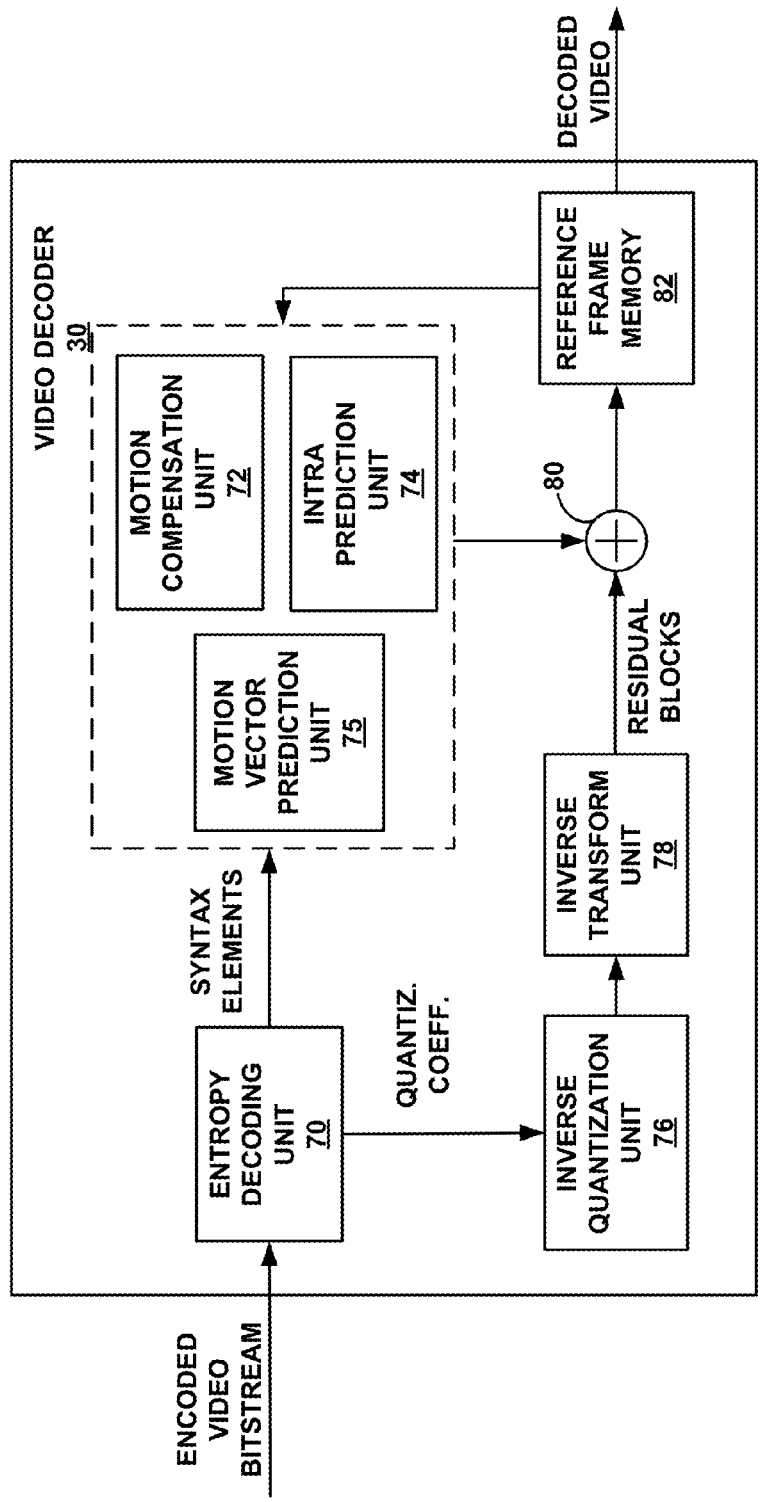
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure. For example, in one embodiment, video decoder 30 may include a motion vector prediction unit 75. Motion vector prediction unit 75 is configured to perform the methods of coding described below with respect to FIGS. 4-6. In some embodiments, the functionality of the motion vector prediction unit 75 may be provided by the motion compensation unit 72, the intra prediction unit 74, or a different unit (not show).

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

In another embodiment, not shown, after the summer 80 reconstructs the video block of the CU, a filter module may perform a deblocking operation to reduce blocking artifacts associated with the CU. After the filter module performs a deblocking operation to reduce blocking artifacts associated with the CU, the video decoder 30 may store the video block of the CU in a decoded picture buffer. The decoded picture buffer may provide reference pictures for subsequent motion compensation, intra prediction, and presentation on a display device, such as display device 32 of FIG. 1. For instance, the video decoder 30 may perform, based on the video blocks in the decoded picture buffer, intra prediction or inter prediction operations on PUs of other CUs.

In a typical video encoder, the frame of the original video sequence is partitioned into rectangular regions or blocks, which are encoded in Intra-mode (I-mode) or Inter-mode (P-mode). The blocks are coded using some kind of transform coding, such as DCT coding. However, pure transform-based coding may only reduce the inter-pixel correlation within a particular block, without considering the inter-block correlation of pixels, and may still produce high bit-rates for transmission. Current digital image coding standards may also exploit certain methods that reduce the correlation of pixel values between blocks.

In general, blocks encoded in P-mode are predicted from one of the previously coded and transmitted frames. The prediction information of a block may be represented by a two-dimensional (2D) motion vector. For the blocks encoded in I-mode, the predicted block is formed using spatial prediction from already encoded neighboring blocks within the same frame. The prediction error (e.g., the difference between the block being encoded and the predicted block) may be represented as a set of weighted basis functions of some discrete transform. The prediction error may also be referred to as residual data. The transform is typically performed on an 8×8 or 4×4 block basis. The weights (e.g., transform coefficients) are subsequently quantized. Quantization introduces loss of information and, therefore, quantized coefficients have lower precision than the originals.

Quantized transform coefficients, together with motion vectors and some control information, may form a complete coded sequence representation and are referred to as syntax elements. Prior to transmission from the encoder to the decoder, all syntax elements may be entropy encoded so as to further reduce the number of bits needed for their representation.

In the decoder, the block in the current frame may be obtained by first constructing the block's prediction in the same manner as in the encoder and by adding to the prediction the compressed prediction error. The compressed prediction error may be found by weighting the transform basis functions using the quantized coefficients. The difference between the reconstructed frame and the original frame may be called reconstruction error.

In H.264/AVC, a video frame or slice is partitioned into square blocks of size 16×16 for encoding and decoding. Such blocks are called macroblocks. In the current high efficiency video coding (HEVC), a video frame or slice is partitioned into square blocks of variable sizes for encoding and decoding. Such blocks may be called coding units or CUs in HEVC. For example, the size of a CU may be 64×64, 32×32, 16×16 or 8×8. Unlike a macroblock, a larger size CU can be split into a number of smaller size CUs. A non-split CU and a macroblock are similar to each other in terms of their concept and functionality.

Once a macroblock or a non-split CU is determined, the block can be further split into a number of partitions for prediction. Such a partition may also be referred as prediction unit or PU in HEVC.

As noted above, this disclosure is related to HEVC scalable video coding (SVC) extension. In SVC, video information may be provided as multiple layers. The bottom layer can just serve as a base layer (BL) and the top layer can serve as an enhancement layer (EL). The layers between the top and bottom layers can serve as both EL and BL. For example, a layer in the middle can be an EL for the layers below it, and at the same time as a BL for the layers above it. For simplicity of description, we sometimes describe methods and devices as if there were only two layers, a BL and an EL; however, it should be clearly understood that all the ideas herein may be applied to video information including more than two layers.

In SVC, base layer motion vector (MV) candidates may be added to a Merge/AMVP candidates list. However, typical base MV insertion can lead to inefficiencies. In another implementation, MV candidate insertion into a Merge/AMVP list can occur during candidate list construction. All operations, including pruning and generation of combined-bi candidates, are performed including the base MV candidates. For related details, reference is made to U.S. Provisional App. No. 61/681,111, filed Aug. 8, 2012, and entitled "INTER LAYER MERGE LIST CONSTRUCTION FOR VIDEO CODING", which is incorporated herein by reference in its entirety. In one implementation, Merge/AMVP candidate list construction process is changed from the process used in the base layer. This may be undesirable since it requires new logic for implementation.

In another implementation, it may be desirable to keep Merge/AMVP candidate lists construction procedure unchanged for the enhancement layer. This implementation is described below.

Motion Vector Candidates

Figures 4, 5:
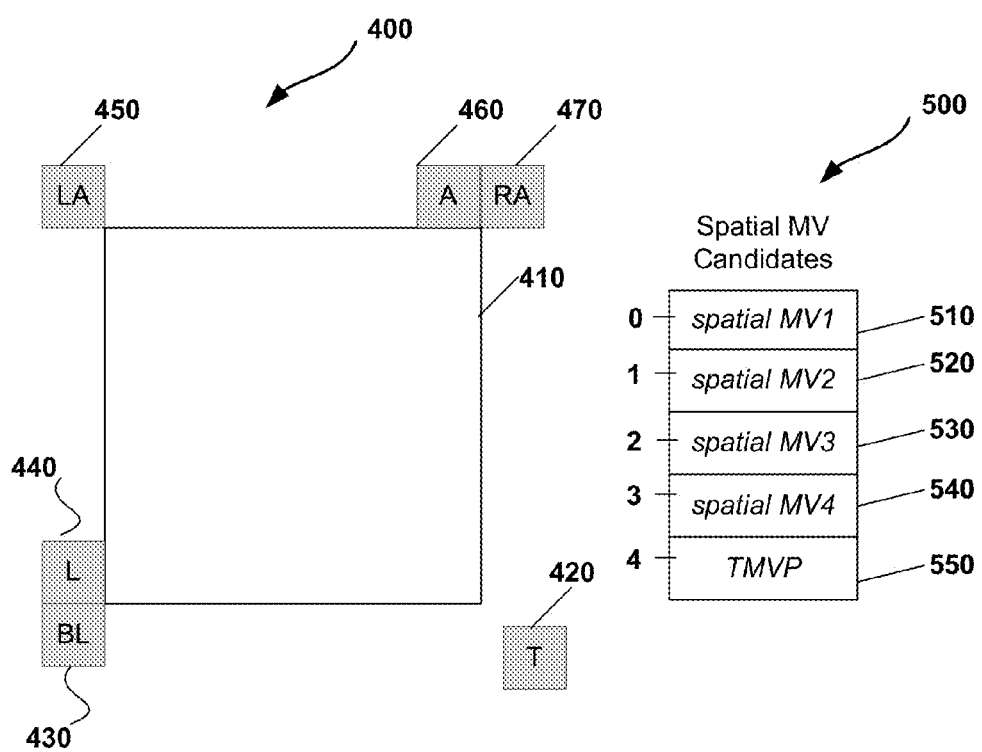
FIG. 4 is a schematic representation of a video block having spatially neighboring video block and a temporal motion vector predictor.
FIG. 5 is an example of a merge candidate list.

As discussed above, during certain coding modes, a list of motion vector candidates may be generated and one or more of the motion vectors may be used to determine the value of a current video block. The motion vector candidates may include motion vector information from one or more spatially neighboring video blocks (e.g., below-left (BL 430), left (L 440), left-above (LA 450), above (A 460), and right-above (RA 470)) as well as one temporally neighboring, co-located video block (e.g., a temporal motion vector predictor, or TMVP (T 420)). These spatially neighboring video blocks 430, 440, 450, 460, 470 and the TMVP 420 are illustrated in FIG. 4. In some embodiments, the current video block 410 (e.g., the video block that is being coded) may inherit or otherwise use the motion information (e.g., motion vectors) of a selected neighboring video block. For example, as illustrated in FIG. 4, video encoder (such as video encoder 20) does not signal the motion vector itself for a video block 410 coded in merge mode. Rather, an index value (e.g., index values 0 to 4, as shown in FIG. 5) may be used to identify the neighboring video blocks (such as a bottom-left neighbor 430, left neighbor 440, left-above neighbor 450, above neighbor 460, or right-above neighbor 470) from which the current video block 410 inherits its motion vector and motion information.

In the merge mode, a merge motion vector (MV) candidate list is typically generated. One example of a merge motion candidate list 500 is illustrated in FIG. 5. In some embodiments, the merge candidate list size value N (e.g., the maximum number of list entries) of the merge candidate list may be signaled (e.g., at a slice header, etc.). According to the current version of the HEVC specification, a merge MV candidate list size cannot be greater than five. However, in some embodiments of this disclosure, the merge candidate list size N may be greater than five.

In some embodiments, a merge MV candidate list 500 may include one or more of the motion vectors of spatial neighbor blocks 430, 440, 450, 460, 470 and a temporally co-located block (e.g., TMVP) 420, as shown in FIG. 4. Four of the five spatial MV candidates and the temporal MV candidate are stored as entries 510, 520, 530, 540, 550 in a merge MV candidate list 500, as shown in FIG. 5.

FIG. 5 shows an illustrative example of a merge candidate list 500 (also called a merge MV candidate list or a MV candidate list 500) having five entries and up to four spatial motion vector candidates added to the merge candidate list (although in other embodiments, the candidate list may have more or less than five entries and have more or less than four spatial candidates added to the merge candidate list). Index values for the five entries in the merge candidate list 500 start at 0 and end at 4. The merge candidates may include spatial candidates, for example as defined in HEVC, and other types of candidates. As shown in FIG. 5, the TMVP 550 may be added after spatial candidates at the end of the list 500, and may have an index value of 4. Four other spatial motion vector candidates, if available (e.g., containing valid motion information), are added into the list 500: spatial MV1 510, which may have an index of 0; spatial MV2 520, which may have an index of 1; spatial MV3 530, which may have an index of 2; and spatial MV4 540, which may have an index of 3. Each spatial MV can be equal to or derived from any spatially neighboring video block (e.g., blocks 430, 440, 450, 460, 470) to the current video block (e.g., block 410). In some embodiments, if some merge candidates are not available, (or if they are pruned or otherwise removed from the list 500) other candidates can be added to the list. For example spatial candidate from block 450 may be added. In some embodiments, if some merge candidates are not available, the TMVP 550 may have an index less than 4.

Some merge candidates in the merge MV candidate list 500 may be compared with other merge candidates to determine if values have been duplicated. MV candidates can be removed from the merge MV candidate list 500 if the same MV is already present in the merge MV candidate list 500. This process may be referred to as pruning. For example, even if five MV candidates are added to the merge MV candidate list 500, after the pruning process, the total number of unique MV candidates could be smaller than five. If the total number of MV candidates after pruning is less than five, additional artificial candidates, based on the ones already inserted in the merge MV candidate list 500, may be generated to fill up the MV candidate list 500. As a result, a merge candidate list may be generated, and a video encoder (e.g., video encoder 20) may signal, in the encoded video bitstream, an index, corresponding to the selected MV candidates from the merge candidate list, in the bitstream to video decoder 30. The merge list of five candidates is used for illustrative purposes. Other numbers of candidates can also be used.

Therefore, to generate a completed merge candidate list, a list size may be determined, and candidates are selected to populate each of the list entries. For example, if the list size has five entries, five candidates are selected, one for each entry. The merge candidate list may then be pruned to remove redundant entries. For example, duplicate entries may be removed from the list, thereby creating empty entries within the list. The merge list generation process may then select additional candidates, e.g., artificial candidates, etc., to populate the empty entries. When the merge candidate list generation process is completed, a completed merge candidate list having no empty entries is generated.

Merge List

Figure 6:
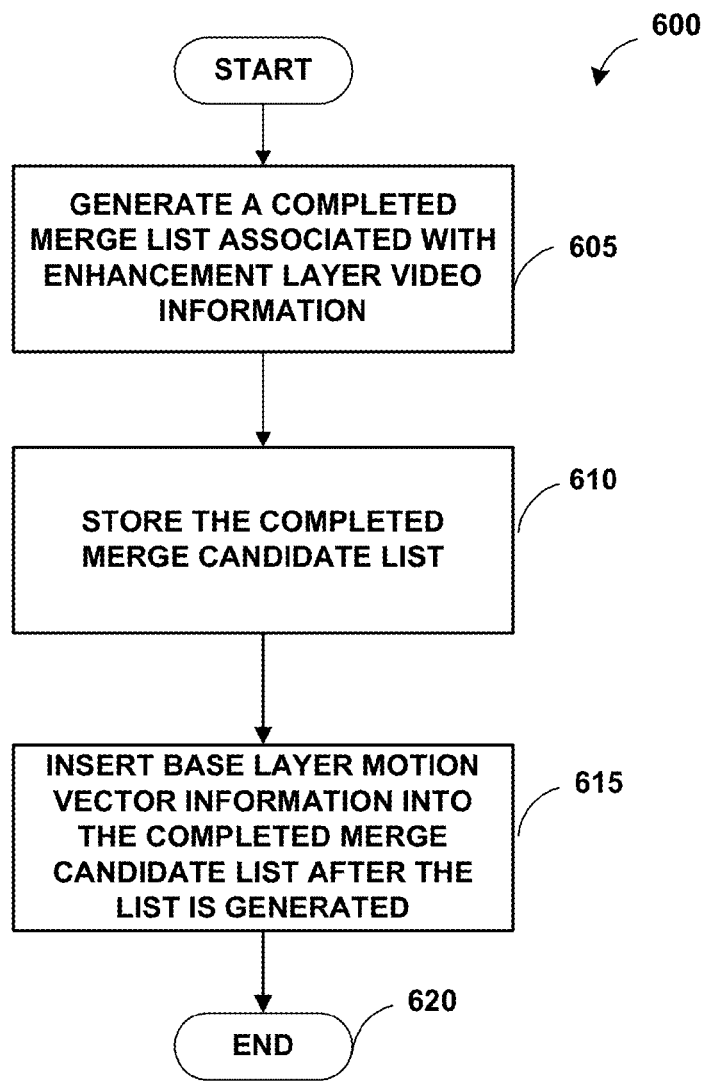
FIG. 6 is a flow chart illustrating a method for coding video information.

FIG. 6 is a flowchart illustrating an embodiment of a method for a coding routine according to aspects of this disclosure. The process 600 may be performed by an encoder (e.g., the encoder as shown in FIG. 2), a decoder (e.g., the decoder as shown in FIG. 3), or any other component. For convenience, the steps of the process 600 are described as performed by a coder, which may be the encoder, the decoder or another component.

It may be desirable to have same Merge/AMVP list generation process for base and enhancement layers. This can be achieved by inserting a base layer MV candidate after completing candidate list generation. For example, as a first stage, at block 605, the coder generates or otherwise obtains an initial Merge/AMVP list, as it is in HEVC standard main or other profiles, or as described above. At block 610, the coder stores the completed Merge/AVMP list, for example, in computer memory. The base layer MV is not involved in this process. As an additional step, at block 615, the base layer MV is inserted as a candidate with index N into the already completed Merge/AMVP candidate list. This index N can be from 0 to the maximum possible number of Merge/AMPV candidates (for example, maximum number of candidates can be 2 for AMVP and up to 5 for Merge mode).

Alternatively or additionally to base layer MV insertion into the completed Merge/AMVP candidate list, base layer MV can replace one of the candidates in the completed list, the candidate index for replacement can be also noted as N.

In yet another implementation, a combination with the base layer MV candidate can be inserted into or replace one or multiple candidates in the completed Merge/AMVP candidate list. Various combinations are possible. For example, the combined MVs can be generated by combining one MV of the base layer with the MV of one of candidates in the completed list. Single or multiple MV candidates can be generated by this way, and these new candidates can be inserted into the completed Merge/AMVP candidate lists or replace one or more candidates in such completed list. N can indicated the indexes of the candidates in the completed Merge/AMVP candidate list that will be replaced or moved as a result of insertion or replacement with candidates generated using a base layer MV. Therefore, N can refer to a single index for one base MV candidate or an array of indexes for multiple generated candidates based on base MV. The decision what index N is used for base layer MV candidate can be fixed. For example, N can be selected to always be zero for Merge mode and two for AMVP.

Alternatively, the index N can be derived according to the statistics associated with the base layer MV candidate usage in the previously coded blocks. For example, in one embodiment, the statistic relate to previously coded blocks. A smaller index will generally use less bits. Therefore, in one embodiment, previously coded blocks are examined to determine frequency of use of a base layer MV candidate. If the base layer MV candidate is overused, or used more than other candidates, or used more than a threshold amount, then a smaller index can be used for that base layer MV candidate. In one non-limiting example, if more than half of the previously-coded blocks use a base layer MV candidate to code the motion vector of those blocks, then the base layer MV candidate can be determined to be very useful, and can be assigned an index of N=0. On the other hand, if the base layer MV candidate is seldom used (e.g., only 1-3 times in the past 15 blocks), then it can be assigned a higher index value, such as N=4, etc. Additionally or alternatively, N can be chosen according to the modes used for the prediction of the neighbor blocks. As yet another embodiment, the N used for base layer MV can be signaled at PU/CU/LCU or slice, picture or sequence headers.

As another embodiment, when the base layer MV is available, it may be inserted as the first candidate of the completed Merge list and one candidate of the completed merge list from stage 1 is removed from the completed list. As an example, the last candidate of the completed merge list is removed. Alternatively, the following process is used to remove one candidate from the final, completed list: if there is at least one candidate which is equal to the base layer MV exists in the completed merge list, the first candidate which is equal to the base layer MV is removed from the completed Merge list; otherwise, the last candidate of the completed merge list is removed. Similar procedures may be applied for the AMVP mode, as well. After processing the merge list, the coder proceeds to block 620 and the routine 600 ends.

Including Multiple BL MVs in the Final Candidate List

More than one base layer MV can be included into the completed Merge/AMVP candidate list (sometimes referred to as a completed merge candidate list) to generate a final candidate list. All ideas described above for one base layer MV candidate are applicable to plurality of the base layer MV candidates, as well.

The base layer MVs can be obtained at the different co-located blocks located in the base layer. For example, the first BL MV is derived from the center position of the co-located block, the second BL MV can be derived from the corner locations of the co-located block, for example top left. Also, first or second, or other BL MVs can be derived outside of the co-located block. The base layer MVs can be scaled according to the spatial aspect ratio.

The BL MV candidates are included into the completed merge candidate list if they are available, for example, if the motion field exists and is unique. They may not be available if the block is intra coded or has not been processed yet. If a candidate is not available at some desired position, then another location can be tried. For example, if the base layer MV is not available at center position, top left or other locations of the co-located block inside or outside can be checked.

If more than one BL MV candidate (including MV and reference index) are derived from the base layer, they first can be compared to determine whether they are equal, or a pruning process can be performed. Only unique MV candidates are included into the completed Merge/AMVP candidate list.

The BL MV can be included with different candidate indices into the Merge/AMVP candidate list. For example, first BL MV is included as a first candidate in the candidate list, and the second BL MV if available and not pruned out can be included as a third or fourth candidate in the list.

Alternatively, one of the BL MV candidates can replace a temporal motion vector predictor TMVP candidate of the completed list. For example, second BL MV candidate can replace TMVP. As yet another alternative, BL MV candidate can replace TMVP if the BL MV is available and unique. For these examples, the replacement can be done either on a completed candidate list or during candidate list derivation.

Alternatively, when the BL MVs (if any) are inserted into the completed Merge or AMVP list, they are inserted into such a completed list that is generated without considering or including a TMVP. For example, the TMVP will have been excluded during the list generation process.

Including a candidate can be treated as an insertion. In such case, the candidates with an index equal to or greater than the desired inserted candidate index are shifted. For example indices associated with such candidates are increased by one. Alternatively including a candidate in a completed list may refer to replacement. For example, a base layer MV candidate may replace the candidate in the candidate list with the particular index. The modified, completed merge candidate list is referred to as a final candidate list.

Increasing Total Number of MV Candidates

If more than one BL MV candidate is inserted into the completed merge candidate list, one BL MV can be included before the TMVP (for example as a first candidate in the list) and another BL MV can be included in the completed merge candidate list after the TMVP.

A total number of candidates in this case can be increased by one for the enhancement layer. For example, the list size may be increase to include 6 candidates for Merge mode. Alternatively, the total number of candidates can be increased by the maximum possible number of BL MV candidates added to the list. For example, as illustrated above, two candidates would be added to the completed list. Therefore, the completed candidate list can be increased by two, i.e., from having 5 entries to having a total of 7 entries.

In addition, combined MV candidates can be generated using both included BL MV candidates, or alternatively using only one of the BL MV candidates, for example, the first BL MV candidates. If the total number of candidates is increased, the number of generated combined MV candidates can be increased or can be kept the same as for a single layer.

One possible implementation of this embodiment for candidate list construction can be as follows. The merge list candidates can be selected in the following order: BL MV1, spatial candidates, TMVP, BL MV2, combined candidates, zero candidates. The total number of candidates can be kept unchanged, or be increased by one (from 5 to 6) or by two (from 5 to 7). Pruning can be done between BL MV1 and the spatial candidates. Combined candidates can be generated on spatial candidates and the TMVP as for single layer, or can be generated in addition on including at BL MV1, BL MV2 or both.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Various embodiments of the invention have been described. These and other embodiments are within the scope of the following claims.

What is claimed is:

1. An apparatus configured to code video information, the apparatus comprising:
   a memory unit configured to store enhancement layer video information, base layer video information, and a completed merge candidate list; and
   a processor in communication with the memory, the processor configured to:
      generate a merge candidate list associated with the enhancement layer video information, the merge candidate list including a list of index values of candidates from which the enhancement layer video information inherits motion information;
      identify redundant list entries within the merge candidate list, the redundant list entries having duplicate index values;
      prune the merge candidate list to remove redundant list entries;
      add at least one index value associated with at least one additional candidate to the merge candidate list;
      create the completed merge candidate list associated with the enhancement layer video information based on the pruned merge candidate list and the at least one index value of the at least one additional candidate;
      combine first base layer motion vector information with motion vector information of one of the candidates of the completed merge candidate list to generate a combined candidate;

replace at least one non-redundant candidate of the completed merge candidate list with the combined candidate after the completed merge candidate list has been created; and create a final candidate list based on the completed merge candidate list and the combined candidate, wherein the processor is further configured to replace, based on a first candidate of the at least one non-redundant candidate being equal to the base layer motion vector information, the first non-redundant candidate with the combined candidate, and further configured to replace a second non-redundant candidate of the at least one non-redundant candidate with the combined candidate based on the completed merge candidate list not including any candidate equal to the base layer motion vector information.

2. The apparatus of claim 1, wherein the combined candidate has an index N that corresponds to the position of the combined candidate within the final candidate list.

3. The apparatus of claim 2, wherein index N is determined based upon a coding mode associated with the video information.

4. The apparatus of claim 3, wherein index N is zero when the coding mode corresponds to a Merge mode and two when the coding mode corresponds to an AMVP mode.

5. The apparatus of claim 2, wherein index N is determined based at least in part on the base layer motion vector information's usage in one or more previously coded blocks.

6. The apparatus of claim 2, wherein index N is determined based at least in part upon a coding mode associated with a neighboring block to a current block being coded.

7. The apparatus of claim 2, wherein index N, wherein index N is signaled at one or more of a prediction unit, a coding unit, a largest coding unit, a slice, a picture, and a sequence header.

8. The apparatus of claim 1, wherein the processor is further configured to add second base layer motion vector information to the completed candidate list.

9. The apparatus of claim 8, wherein the first and second base layer motion vector information are associated with different base layer blocks.

10. The apparatus of claim 1, further comprising an encoder configured to encode the video information based at least in part on the final candidate list.

11. The apparatus of claim 1, further comprising a decoder configured to decode the video information based at least in part on the final candidate list.

12. The apparatus of claim 1, further comprising a coding device selected from the group comprising: a desktop computer, a notebook computer, a laptop computer, a tablet computer, a set-top box, a telephone handset, a smart phone, a smart pad, a television, a camera, a display device, a digital media player, a video gaming console, or an in-car computers.

13. A method of decoding video information, the method comprising:

storing, in computer memory, enhancement layer information, base layer video information, and a completed merge candidate list;

generating a merge candidate list associated with the enhancement layer video information, the merge candidate list including a list of index values of candidates from which the enhancement layer video information inherits motion information;

identifying redundant list entries within the merge candidate list, the redundant list entries having duplicate index values;

pruning the merge candidate list to remove redundant list entries;

adding at least one index value associated with an additional candidate to the merge candidate list;

creating the completed merge candidate list associated with the enhancement layer video information based on the pruned merge candidate list and the at least one index value of the additional candidate;

generating a combined candidate by combining base layer motion vector information with motion vector information of one of the candidates of the completed merge candidate list;

replacing at least one non-redundant candidate of the completed merge candidate list with the combined candidate after creating the completed merge candidate list;

creating a final candidate list based on the completed merge candidate list and the combined candidate, wherein the processor is further configured to replace, based on a first candidate of the at least one non-redundant candidate being equal to the base layer motion vector information, the first non-redundant candidate with the combined candidate, and further configured to replace a second non-redundant candidate of the at least one non-redundant candidate with the combined candidate based on the completed merge candidate list not including any candidate equal to the base layer motion vector information; and decoding the enhancement layer video information using the final candidate list.

14. The method of claim 13, wherein the combined candidate has an index N that corresponds to the position of the combined candidate within the final candidate list.

15. The method of claim 14, wherein index N is determined based upon a coding mode associated with the video information.

16. The method of claim 15, wherein index N is zero when the coding mode corresponds to a Merge mode and two when the coding mode corresponds to an AMVP mode.

17. The method of claim 14, wherein index N is determined based at least in part on the base layer motion vector information's usage in one or more previously coded blocks.

18. The method of claim 14, wherein index N is determined based at least in part upon a coding mode associated with a neighboring block to a current block being coded.

19. The method of claim 14, wherein index N, wherein index N is signaled at one or more of a prediction unit, a coding unit, a largest coding unit, a slice, a picture, and a sequence header.

20. A method of encoding video information, the method comprising:

storing, in computer memory, enhancement layer information, base layer video information, and a completed merge candidate list;

generating a merge candidate list associated with the enhancement layer video information, the merge candidate list including a list of index values of candidates from which the enhancement layer video information inherits motion information;

identifying redundant list entries within the merge candidate list, the redundant list entries having duplicate index values;

pruning the merge candidate list to remove redundant list entries;

adding at least one index value associated with an additional candidate to the merge candidate list;

creating the completed merge candidate list associated with the enhancement layer video information based on the pruned merge candidate list and the at least one index value of the additional candidate;

generating a combined candidate by combining base layer motion vector information with motion vector information of one of the candidates of the completed merge candidate list;

replacing at least one non-redundant candidate of the completed merge candidate list with the combined candidate after creating the completed merge candidate list;

creating a final candidate list based on the completed merge candidate list and the combined candidate, wherein the processor is further configured to replace, based on a first candidate of the at least one non-redundant candidate being equal to the base layer motion vector information, the first non-redundant candidate with the combined candidate, and further configured to replace a second non-redundant candidate of the at least one non-redundant candidate with the combined candidate based on the completed merge candidate list not including any candidate equal to the base layer motion vector information; and encoding the enhancement layer video information using the final candidate list.

21. The method of claim 20, wherein the combined candidate has an index N that corresponds to the position of the combined candidate within the final candidate list.

22. The method of claim 21, wherein index N is determined based upon a coding mode associated with the video information.

23. The method of claim 22, wherein index N is zero when the coding mode corresponds to a Merge mode and two when the coding mode corresponds to an AMVP mode.

24. The method of claim 21, wherein index N is determined based at least in part on the base layer motion vector information's usage in one or more previously coded blocks.

25. The method of claim 21, wherein index N is determined based at least in part upon a coding mode associated with a neighboring block to a current block being coded.

26. The method of claim 21, wherein N, wherein index N is signaled at one or more of a prediction unit, a coding unit, a largest coding unit, a slice, a picture, and a sequence header.

27. A non-transitory computer readable medium comprising code that, when executed, causes an apparatus to:
store enhancement layer information, base layer video information, and a completed merge candidate list;
generate a merge candidate list associated with the enhancement layer video information, the merge candidate list including a list of index values of candidates from which the enhancement layer video information inherits motion information;
identify redundant list entries within the merge candidate list, the redundant list entries having duplicate index values;
prune the merge candidate list to remove redundant list entries;
add at least one index value associated with an additional candidate to the merge candidate list;
create the completed merge candidate list associated with the enhancement layer information based on the pruned merge candidate list and the at least one index value of the additional candidate;
combine first base layer motion vector information with motion vector information of one of the candidates of the completed merge candidate list to generate a combined candidate;
replace at least one non-redundant candidate of the completed merge candidate list with the combined candidate after the completed merge candidate list has been created; and
create a final candidate list based on the completed merge candidate list and the combined candidate, wherein the processor is further configured to replace, based on a first candidate of the at least one non-redundant candidate being equal to the base layer motion vector information, the first non-redundant candidate with the combined candidate, and further configured to replace a second non-redundant candidate of the at least one non-redundant candidate with the combined candidate based on the completed merge candidate list not including any candidate equal to the base layer motion vector information.

28. The non-transitory computer readable medium of claim 27, wherein the code, when executed, causes the apparatus to replace said base layer motion vector information as the first candidate in the completed candidate list and remove the last candidate in the completed merge candidate list.

29. A video coding device configured to code video data, the video coding device comprising:
means for storing, in a computer memory, enhancement layer video information, base layer video information, and a completed merge candidate list;
means for generating a merge candidate list associated with the enhancement layer video information, the merge candidate list including a list of index values of candidates from which the enhancement layer video information inherits motion information;
means for identifying redundant list entries within the merge candidate list, the redundant list entries having duplicate index values;
means for pruning the merge candidate list to remove redundant list entries;
means for adding at least one index value associated with an additional candidate to the merge candidate list;
means for creating the completed merge candidate list associated with the enhancement layer information based on the pruned merge candidate list and the at least one index value of the additional candidate;
means for generating a combined candidate by combining base layer motion vector information with motion vector information of one of the candidates of the completed merge candidate list;
means for replacing the combined candidate as a candidate into the completed candidate list after the completed candidate list has been created; and
means for creating a final candidate list based on the completed merge candidate list and the combined candidate, wherein the processor is further configured to replace, based on a first candidate of the at least one non-redundant candidate being equal to the base layer motion vector information, the first non-redundant candidate with the combined candidate, and further configured to replace a second non-redundant candidate of the at least one non-redundant candidate with the combined candidate based on the completed merge candidate list not including any candidate equal to the base layer motion vector information.

* * * * *